R. BURGER & A. ASCHENBRENNER.

FIELD OR HUNTING FLASK.

APPLICATION FILED MAR. 15, 1909.

Reissued Mar. 15, 1910.

13,093.

Witnesses

C. M. Walker

C. H. Potter

Inventors

Reinhold Burger

Albert Aschenbrenner by Byrnes, Townsend & Brickenstein

Attorneys

UNITED STATES PATENT OFFICE.

REINHOLD BURGER AND ALBERT ASCHENBRENNER, OF BERLIN, GERMANY, ASSIGNORS TO AMERICAN THERMOS BOTTLE COMPANY, OF NEW YORK, N. Y., A CORPORATION OF MAINE.

FIELD OR HUNTING FLASK.

13,093. Specification of Reissued Letters Patent. Reissued Mar. 15, 1910.

Original No. 820,347, dated May 8, 1906, Serial No. 223,254. Application for reissue filed March 15, 1909. Serial No. 483,658.

*To all whom it may concern:*

Be it known that we, REINHOLD BURGER and ALBERT ASCHENBRENNER, subjects of the King of Prussia, German Emperor, residing in Berlin, Germany, have invented certain new and useful Improvements in Field or Hunting Flasks, (for which we have obtained a patent in Great Britain, numbered 4,421, A. D. 1904, and in France, numbered 340,627;) and we do hereby declare that the following is a full, clear, and exact description of the same.

This invention relates to field or hunting flasks for the conveyance and storing of liquids, more particularly of beverages. Vessels of a similar kind are already known and have been used for other purposes; but they have not the characteristic shape of our improved bottle and are not provided with a protective jacket.

Another feature of our invention consists in the fact that a layer of heat-insulating material is arranged in peculiar manner between the two glass walls in order to prevent the breaking of the glass by concussions or the like at that part where the inner wall of the bottle is connected with the outer wall—that is to say, at the neck of the bottle. Special novel means for this purpose will be described hereinafter.

Another feature of the invention consists in the fact that the tubes for evacuating the bottle are not arranged at the center of the bottom, but at the side thereof, so that it can be more effectually protected from injury and that the bottle and its jacket can be given a more suitable shape.

The invention is illustrated in the annexed drawings, in which similar letters indicate similar or equivalent parts.

Figure 2:
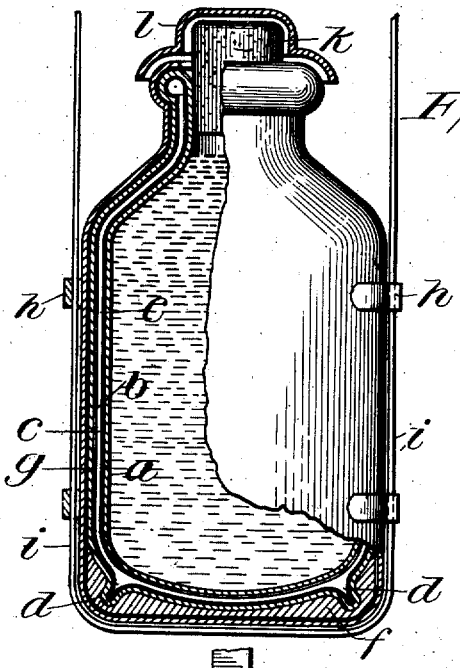
Figure 4:
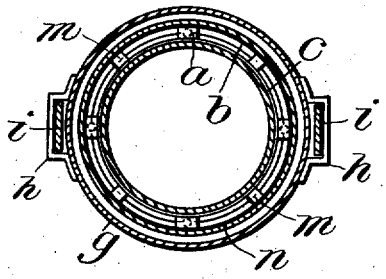
Figure 1:
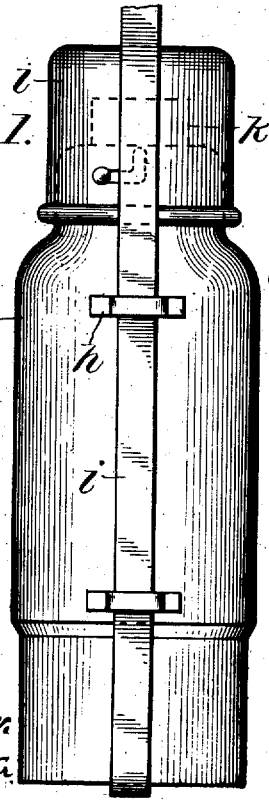
Figure 3:
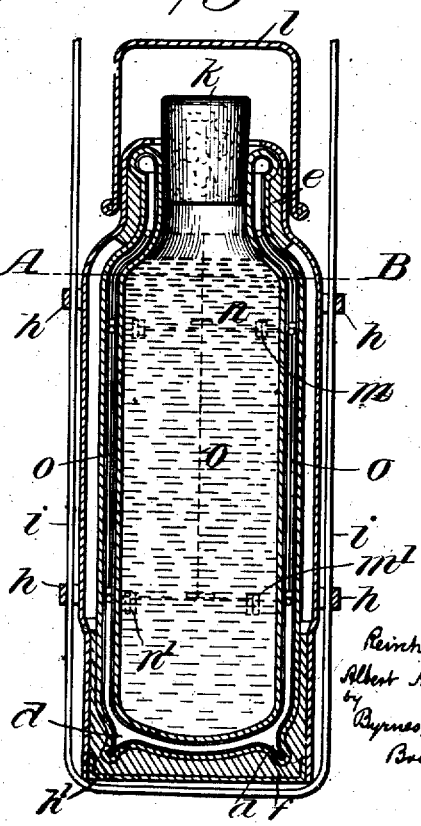

Figure 1 is a side view of one form of the improved bottle; Fig. 2, a partial vertical section through the central axis of another form thereof; Fig. 3, a vertical section through Fig. 1, and Fig. 4 a section on the line A B of Fig. 3.

The field or hunting flask shown in Figs. 1 and 2 comprises a substantially cylindrical inner glass receptacle *a*, somewhat constricted at the neck, and an outer glass receptacle *b*, which is also somewhat constricted at the neck. These two receptacles are carefully fused together at the neck, the entire inner surface having been coated with a mercury layer *c*. The air between the receptacles is then evacuated or exhausted through tubular projections *d* in the foot of the outer receptacle, which are then sealed. Around the neck of the bottle is arranged an annular cushion or protector *e*, and the foot or bottom of the bottle is inclosed in a cup-shaped cushion or protector *f*, of suitable elastic material—such as cotton, wool, asbestos, or the like—or of colophony, shellac, sealing-wax, or other suitable rigid material. The bottle is inclosed in a substantially cylindrical metal case *g*, to which are soldered four metal bows *h*, forming eyes. The under part of the case *g* is closed by a cup-shaped bottom *h'*, which is soldered or fixed in any other suitable manner to the case *g*. Through the bows *h* a strap *i* can be drawn to serve for carrying the bottle, as usual with field-flasks. Into the mouth of the bottle a cork or other stopper *k* can be inserted, and a removable inverted cup *l* can be pushed over the neck. This cup can be held in place in any suitable manner.

In the form of construction shown in Fig. 3 disks or plates *m m'*, of asbestos board or other suitable heat-insulating material, are arranged between the receptacles *a* and *b*, so that the latter mutually support each other. Some of the said plates are horizontally arranged and others vertically. The vertical plates are supported by wire rings *n n'*, fixed to a number of vertical wires *o*, which support the horizontal plates *m* and *m'*. The upper ends of the wires *o* are bent over the curved part of the inner receptacle *a* at the neck of the bottle and are fixed to a wire ring *o'* (indicated by dotted lines in the drawings) and fastened around the neck of said inner receptacle.

We do not restrict our claims to the form of bottle consisting of two glass receptacles *a* and *b*, which is shown in the drawings, but also claim all other forms in which the bottle could be used as a field or hunting flask or the like. It must also be noted that the outer receptacle *b* can be inclosed in a casing of leather or other suitable material—as, for instance, of paper, papier-mâché, artificial leather, woven or knitted fabric, and the like. Finally, we desire to point out that the practical value of our invention consists in the fact that the liquid contained in the improved bottle remains for many hours at the same temperature as that which it had when poured into the bottle. Thus, for instance, a workingman who fills his bottle in the morning with hot coffee or milk can keep the liquid till the evening, when it will still be hot. It will thus easily be understood that the bottle can with great advantage be used especially in the field or when hunting.

Having now particularly described and ascertained the nature of our said invention and in what manner the same is to be performed, we declare that what we claim is:

1. A flask, comprising separated receptacles connected at their necks and inclosing a vacuum-chamber between their bodies, heat-insulating members annularly disposed in the chamber, and means embracing the neck of the inner receptacle and holding the said members in position, substantially as described.

2. A flask, comprising separated receptacles connected at their necks and inclosing a vacuum-chamber between their bodies, horizontal and vertical insulating members annularly disposed in the chamber, and a wire structure suspended from the neck of the inner receptacle and holding the said members in position, substantially as described.

3. A flask, comprising an inner receptacle, and an outer receptacle connected thereto at the neck and presenting in conjunction with the first a vacuum-chamber and having two sealing-teats one at each side of the bottom, heat-insulating members annularly disposed in the chamber, and means for holding the said members in position, substantially as described.

4. A flask, comprising an inner receptacle, and an outer receptacle connected thereto at the neck and presenting in conjunction with the first a vacuum-chamber and having two sealing teats one at each side of the bottom, heat-insulating members annularly disposed in the chamber, means for holding the said members in position, a jacket inclosing the outer receptacle, and a filling interposed between the outer receptacle and its jacket at the neck and foot, substantially as described.

5. In combination with a vacuum glass double walled vessel, a plurality of supports inserted between the walls of said vessels, and means for holding said supports against displacement.

6. In combination with a vacuum glass double walled vessel, a plurality of supports of elastic material interposed between the walls of said vessels, and means for holding said supports against displacement.

7. In combination with a vacuum glass double walled vessel, a plurality of supports of heat insulating material interposed between the walls of said vessels, and means for holding said supports against displacement.

8. In combination with a vacuum glass double walled vessel having a constricted neck and a cylindrical portion, a plurality of supports interposed between the walls of said body portion at a distance from said neck.

9. In combination with a vacuum glass double walled vessel, a plurality of supports interposed between the walls of said vessel and mutually connected together.

10. In combination with a vacuum glass double walled vessel, a plurality of supports interposed between the walls of said vessel, and a ring connecting said supports.

11. In combination with a vacuum glass double walled vessel, a casing of metal covering the said vessel and having a flange extending over the circumferential edge of the mouth thereof.

12. In combination with a vacuum glass double walled vessel having a constricted neck, a casing of less frangible material covering the outer surface of said vessel and having a constricted neck completely inclosing said vessel neck, and an annular band of elastic material disposed in and filling the space between said necks.

13. In combination with a vacuum glass double walled vessel having a constricted neck, a casing of less frangible material covering the outer surface of said vessel, and means wholly inclosing the neck of said vessel for supporting the same within said casing.

14. In combination with a vacuum glass double walled vessel having a constricted neck, a casing of less frangible material covering the outer surface of said vessel, means wholly inclosing the neck of said vessel for supporting the same within said casing, and means interposed between the walls of said vessel for preventing lateral vibrations of the inner wall.

15. In combination with a vacuum glass double walled vessel having a sealing teat, a casing covering the outer surface of said vessel, and a body of elastic material interposed between the said vessel and said casing and embedding said sealing teat.

In testimony whereof we affix our signatures in presence of two witnesses.

REINHOLD BURGER.
ALBERT ASCHENBRENNER.

Witnesses:
WOLDEMAR HAUPT,
HENRY HASPER.